United States Patent Office 3,341,209
Patented Sept. 12, 1967

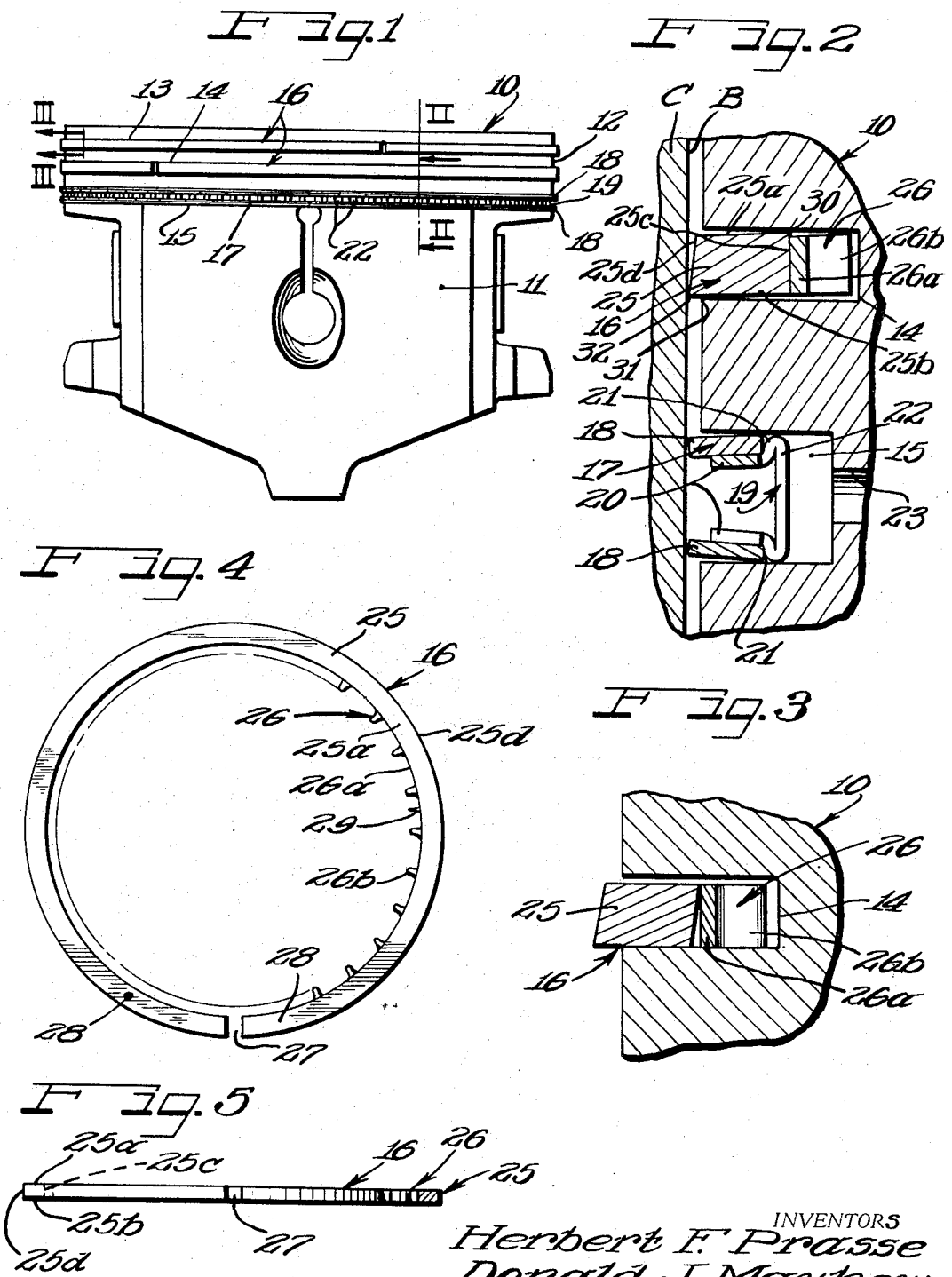

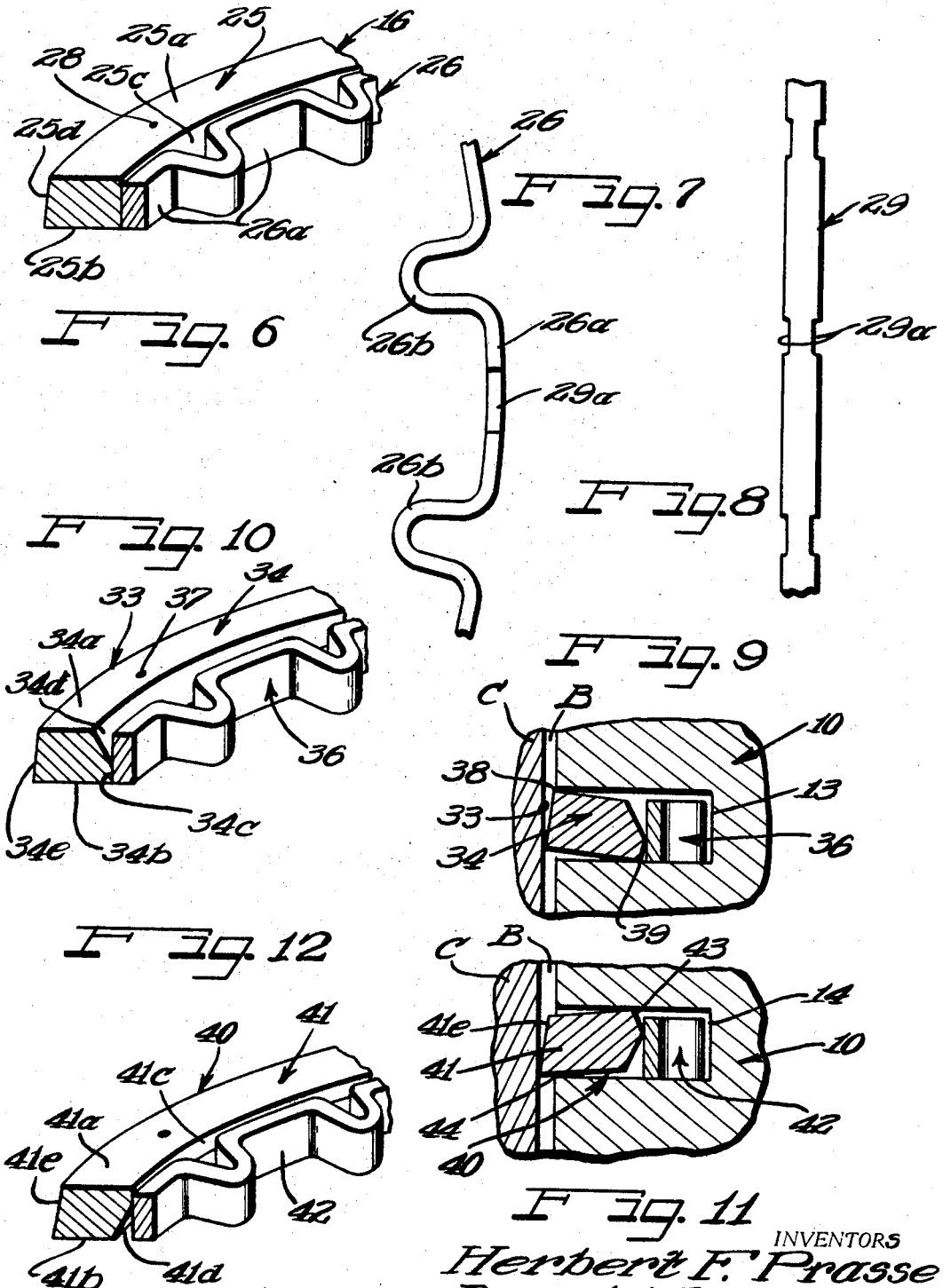

3,341,209
CIRCUMFERENTIALLY EXPANDING COMPRESSION PISTON RING
Herbert F. Prasse, Town and Country, and Donald J. Mayhew, Manchester, Mo., assignors to Ramsey Corporation, St. Louis, Mo., a corporation of Ohio
Filed Aug. 20, 1964, Ser. No. 390,930
6 Claims. (Cl. 277—160)

This invention relates to highly flexible compression rings for piston and cylinder assemblies of internal combustion engines and the like and specifically deals with a twistable solid metal split compression ring backed by a circumferentially expanding spring metal ring effective to expand and twist the solid metal ring into conformity with a cylinder wall and into side sealing engagement with the sides of a piston ring groove.

Compression rings for the top and intermediate ring grooves of internal combustion engine pistons have heretofore been heavy, massive and rigid to resist the high temperatures and wear and to exert a sufficient sealing pressure to be effective. Such rings required relatively deep and wide ring grooves thus necessitating an elongated ring band area on the piston. Modern engine design now emphasizes short pistons and the heretofore provided long and massive ring bands are no longer available on short pistons.

The present invention now provides a very flexible compression piston ring assembly which does not require wide or deep ring grooves and which readily adapts itself to cylinder bore irregularities to more efficiently maintain good sealing contact with both the piston and the bore.

A feature of this invention resides in the provision of a semi-flexible compression piston ring having a tapered cylinder engaging periphery and a capacity for twisting in the ring groove which is accentuated by a circumferential spring expander backing up the ring.

Another feature of the invention is the controlling of the direction of twist of the semi-flexible compression ring to create a side sealing effect with the ring groove at either the outer upper and lower inner periphery of the ring or at the upper inner and lower outer periphery of the ring depending upon the preferred end use for the ring. The side sealing at the outer upper and lower inner peripheries of the ring is best suited for a gas seal and consequently for top ring groove application while the reverse side sealing at the upper inner and lower outer peripheries of the ring is better suited for oil control and thus for second groove application.

It is then an object of this invention to provide a very flexible compression ring adapted to readily conform to bore irregularities and backed by a spring expander which not only urges the ring against the bore wall but also twists the ring into good side sealing contacts with the sides of the ring groove.

Another object of this invention is to provide a thin narrow width semi-flexible compression ring for both the top and intermediate ring grooves of a piston.

Another object of the invention is to provide a semi-flexible compression ring assembly composed of a relatively "dead" split iron ring having a tapered outer periphery and backed by a circumferential spring expander twisting the ring in a ring groove while urging it into contact with a cylinder wall at the bottom edge of the ring.

Another object of the invention is to provide a semi-flexible compression ring assembly composed of a split thin, narrow metal ring backed by a circumferential expander spring effective to twist the ring into contact with the ring groove at the upper outer and lower inner peripheries of the ring.

Another object of the invention is to provide an intermediate compression ring assembly composed of a split thin, narrow metal ring backed by a circumferential expander spring effective to twist the ring in the ring groove so that its upper inner and lower outer peripheries will contact the sides of the groove.

A still further object of the invention is to provide a flexible compression ring assembly for internal combustion engine pistons composed of a flexible metal ring backed by a spring expander contacting a major portion of the inner circumference of the ring at closely spaced areas and effective to exert a uniform pressure around the entire circumference of the ring while simultaneously twisting the ring.

Another object of the invention is to provide a semi-flexible compression piston ring with a tapered periphery and an inner circumferential expander spring effective to change the degree of taper when the ring is radially compressed in use.

Other and further objects of the invention will be apparent to those skilled in this art from the following detailed description of the annexed sheets of drawings which by way of preferred examples only illustrate several embodiments of the invention.

On the drawings:

FIGURE 1 is an elevational view of a short piston equipped with compression ring assemblies of this invention.

FIGURE 2 is an enlarged fragmentary cross sectional view along the line II—II of FIG. 1 and illustrating the piston mounted in a cylinder with the rings in a compressed condition.

FIGURE 3 is a fragmentary cross sectional view similar to FIG. 2 but taken only along the line III—III of FIG. 1 and showing the ring assembly in a free state condition.

FIGURE 4 is a plan view of the ring assembly of FIG. 3.

FIGURE 5 is an elevational view of the assembly of FIG. 4 with a portion broken away and shown in cross section.

FIGURE 6 is a fragmentary perspective view of the assembly of FIGS. 4 and 5.

FIGURE 7 is a fragmentary plan view of a spring expander for the assembly of FIGS. 4 to 6.

FIGURE 8 is an elevational view of a strip of spring steel for making the expander of FIG. 7.

FIGURE 9 is an enlarged fragmentary cross sectional view of a preferred form of top ring groove assembly of this invention showing the assembly in compressed condition in a cylinder and piston groove.

FIGURE 10 is a perspective view of the assembly of FIG. 9 in a free state condition.

FIGURE 11 is a view similar to FIG. 9 but illustrating another modification of the assembly of this invention preferred for intermediate ring groove application.

FIGURE 12 is a perspective view of the assembly of FIG. 11 in a free state condition.

As shown on the drawings:

The piston 10 of FIG. 1 is very short in axial height compared to its diameter and is typical of the short pistons used in modern internal combustion engines having a reduced skirt portion 11 and a narrow ring band portion 12 with a top compression ring groove 13, an intermediate compression ring groove 14 and a bottom oil ring groove 15. Compression ring assemblies 16 of this invention are seated in the grooves 13 and 14 while an oil ring assembly 17 is seated in the groove 15.

As shown in FIGS. 1 and 2 the oil ring assembly 17 is of a conventional rail ring and spacer expander type with a pair of thin metal rail rings 18 supported on a spacer expander spring ring 19. The spacer expander 19 is an outwardly opening channel ring composed of supporting leg segments 20 for the rails 18 backed by inclined lips 21 dishing the rings into side sealing engagement with the sides of the ring groove and having cross bars or legs 22 holding the legs 20 in axially spaced relation. The spacer expander 19 is a circumferential spring which is not bottomed in the ring groove 15 and which has open spaces between the legs 19 to accommodate oil drainage through the drain holes such as 23 to the interior of the piston.

The compression ring assemblies 16 of this invention as best shown in FIGS. 2 to 6 include a split solid metal outer component 25 and an inner component 26. The outer component is a solid split ring of standard piston ring iron or any of the high strength versions thereof including nodular iron or may be composed of high carbon steels such as SAE 1085, 1095, 52100, and the like which are heat treated to produce relatively "dead" ring bodies.

The inner component 26 is a heat treated spring metal such as high carbon spring steel, any of the temperature resistant stainless steels such as SAE 302, 401, and the like, and materials such as beryllium copper with the higher metal alloys being used for the top ring groove.

If desired the ring component 25 can be covered with a wear resistant surface, especially around the outer periphery thereof, such as molybdenum, chromium, tungsten, and the like.

The ring component 25 has a flat top face 25a, a flat bottom face 25b, a cylindrical inner periphery 25c and a tapered outer periphery 25d converging from the bottom face 25b to the top face 25a. In its free state the ring component 25 has a gap 27 between the split ends thereof which is decreased to a minimum when the ring is compressed in a cylinder in a ring groove. To identify the top 25a so that the tapered periphery 25d will be properly pressed in a cylinder in a ring groove. To identify the top the groove, a marking such as a dot 28, is placed on the top face 25a.

The ring component 26 is a radially corrugated spring metal strip in annular form with the ends abutted together at 29 and composed of circumferentially wide outer peripheral segments 26a alternating with U-shaped loops 26b opening outwardly and having the bight portion at the radial inner periphery thereof. The strip is preferably narrower than the axial height of the component ring 25 so as not to "hang up" or bind in the ring groove. The portions 26a mate with the cylindrical wall 25c of the outer ring component and since these segments 26a form most of the ring component 26, the inner component engages the outer component around the entire inner periphery 25c of the outer component and contacts most of the circumference of this inner periphery.

As shown in FIG. 8 the component 26 may be conveniently formed from a metal ribbon or strip 29 which is relatively thin and in the order of about 0.024 inch. The width of the strip is in the order of about 0.060 inch. For ease in feeding the strip through automatic machinery to center the loops or humps, shallow notches 29a are cut in the edges of the strip at spaced intervals along the length and the strip is bent so that these notches will be in the portions 26a of the ring component 26 as shown in FIG. 7. The notches may be eliminated if desired. The loop portions or humps 26b have a radial depth in the order of 0.085 inch and an inner bight circumferential width in the order of 0.050 inch.

To cooperate with a component 26 of the dimensions indicated above, the outer component 25 should have an axial height or within the order of 0.063 inch with a radial depth of about 0.09 inch. The free state taper of the outer periphery should be in the order of 1 degree. Therefore the ring component 25 has a very thin axial height or width and a fairly shallow radial depth as compared with standard compression rings.

As shown in FIG. 2 the ring assembly 16 fits freely in the groove 14 and is not bottomed in the ring groove. The expander component 26 in acting on the cylindrical inner periphery 25c of the outer component 25 with the circumferential expanding force created by contracting the assembly in the bore B of an engine cylinder C urges the tapered outer periphery 25d of the ring component 25 against the bore wall uniformly around the entire periphery of the ring component 25 and at the same time twists the component in the ring groove to engage the upper inner periphery thereof against the top side face of the ring groove 14 as at 30 and the bottom outer periphery against the bottom face of the ring groove 14 as at 31 while the bottom edge portion of the tapered periphery 25d engages the bore B as at 32. Thus the expansion force exerted by the expander component 26 not only causes the component 25 to sealingly engage the bore B but also causes the top and bottom faces of the component to sealingly engage the top and bottom sides of the ring groove. The narrower axial height or width of the inner expander component 26 than the outer ring component 25 insures the free twisting of the outer component 25 without binding the inner component on the ring groove walls even though the inner component assumes an inclined position as shown in FIG. 2. The engagement of the outer periphery 25d with the bore B only at the bottom peripheral portion 32 thereof insures a high unit loading of the outer ring component 25 on the bore wall B with a resultant quick wear-in period for the assembly. Any irregularities in the bore wall B are accommodated by the very flexible ring component 25 and sealing contact at 32 is maintained around the entire periphery of the ring component 25 regardless of these irregularities.

As shown in FIG. 3 the free state condition of the assembly 16 in the ring groove 14 emphasizes the relative width and depth of the ring assembly and ring groove to highlight the freedom for movement of the ring assembly in the ring groove and the independence of the ring assembly from coacting with the bottom of the ring groove.

In some instances it is desirable to reversely incline or twist the compression ring in the ring groove as for example in the top ring groove 13 of the piston in FIG. 1 and, as shown in FIGS. 9 and 10, this reverse twisting is brought about by chamfering the upper portion of the inner periphery of the outer ring component. As shown in these figures the modified ring assembly 33 includes the outer ring component 34 and the inner ring component 36 with this component 36 being identical with the spring ring 26 described in FIGS. 2 to 6. The outer component 34 however has a flat top face 34a of materially less radial depth than the flat bottom face 34b thereof. The inner periphery of the ring 34 has a cylindrical portion 34c of relatively short axial height or width and the rest of the periphery is chamfered at 34d to slope radially outward and axially upward to the top wall 34a. The ring has an outer periphery 34e tapering axially upward and radially inward from the bottom face 34b thereof. The top face 34a is identified from the bottom face 34b by a marking such as 37 although the necessity for the marking is not needed as much as in the ring component 25 because the face 34a is much more shallow than the face 34b. The provision of the chamfered inner periphery 34d causes the ring to twist in a direction so that the outer upper peripheral portion and the lower inner peripheral portion of the ring component 37 engages the top and bottom faces of the ring groove 13 as indicated at 38 and 39 respectively in FIG. 9. This is a better configuration for a gas seal such as is necessary at the top ring groove 13 of the piston than the reverse twist illustrated for the ring assembly 16 in FIG. 2 of the drawings.

If it is desired to enhance the twist of the ring assembly 16 and in the same direction as this assembly a further modified arrangement illustrated in FIGS. 11 and 12 can be used wherein the assembly 40 has an outer component 41 and an inner component 42 with the inner component being identical with component 26 of the assembly 16 and with the outer component differing from the component 25 of this assembly 16 by having a chamfered inner peripheral portion on the bottom thereof. Thus as shown in these figures the ring component 41 has a relatively deep top flat face 41a, a shallower bottom flat face 41b, a cylindrical inner peripheral portion 41c at the top face 41a and extending to a chamfered portion 41d which slopes axially downward and radially outward to the bottom face 41b. The outer periphery 41e of the ring is tapered from the bottom face 41b to the top face 41a in the same manner as in the ring component 25.

Because of the chamfered portion 41d the twist of the component 41 in the ring groove 14 is accentuated as shown in FIG. 11 with the expander 42 acting on the upper peripheral portion 41c of the inner periphery and causing the ring to assume a more pronounced twist decreasing the taper angle of the outer periphery relative to the bore B. This arrangement is better suited as an oil seal for intermediate compression ring groove positions. As shown in FIG. 11 the upper inner peripheral portion of the component 41 contacts the upper side or top of the ring groove 14 at 43 while the outer lower peripheral portion of the component 41 contacts the bottom side wall of the ring groove 14 at 44.

From the above descriptions it will therefore be understood that the invention provides piston ring assemblies especially suited for compression ring groove application wherein an outer flexible component is urged into conformity with the cylinder bore by an inner expander component of the circumferential spring type which twists the outer component into sealing engagement with the ring groove. It will also be understood that the invention provides flexible compression ring assemblies especially designed for top ring groove and intermediate ring groove application with the top groove assembly having an upward twistable flexible compression ring component to provide a gas seal while the intermediate groove assembly has a component which is twisted in a downward direction to provide a better oil seal. The assemblies of the invention are narrow in the axial direction for use in narrow piston ring grooves and are shallow in a radial direction thus being well adapted for use in the short piston modern engines.

Although various minor modifications might be suggested by those versed in the art, it should be understood that we wish to embody within the scope of the patent granted hereon all such embodiments as reasonably and properly come within the scope of our contribution to the art.

We claim as our invention:

1. A compression ring assembly adapted for top ring groove use in internal combustion engine pistons which comprises a narrow solid metal outer split ring component having opposed side faces and a tapered outer periphery together with a cylindrical inner peripheral portion substantially normal to the side faces, one of said side faces being radially shorter than the other of said side faces, a mark on the short side face distinguishing the short from the long faces, a circumferential expansion spring ring component within the outer component acting on the cylindrical inner peripheral portion thereof, said inner spring ring component having circumferentially wide peripheral portions engaging the inner periphery of the outer component and spring loops connecting the circumferential portions and effective to expand said portions radially for expanding the outer ring component, said outer ring component and said spring ring component having narrow axial widths and shallow radial depths, and said spring ring component having an inner diameter larger than the diameter of the ring groove to provide a free fit for the assembly in the ring groove to accommodate twisting of the outer ring component as it is expanded by the inner ring component.

2. A compression ring assembly especially suited for top ring groove usage as a gas seal which comprises a solid metal outer split ring having a tapered outer periphery converging from the bottom face thereof and a chamfered inner periphery sloping axially upward and radially outward from adjacent the bottom wall of the outer ring, said outer ring having a bottom wall of greater radial depth than the top wall thereof, and a circumferential expansion spring ring within said outer ring acting on the inner periphery thereof and effective to twist the outer ring in a direction for increasing the tapered angle of the outer periphery, said outer ring and said spring ring having narrow axial widths and shallow radial depths and said spring ring having an inner diameter larger than the diameter of the ring groove to provide a free fit for the assembly in the ring groove accommodating said twisting of the outer ring by the spring ring.

3. A flexible compression ring assembly for internal combustion engine pistons and the like especially suitable for intermediate ring groove usage which comprises an outer split metal ring having a tapered periphery converging from the bottom to the top faces thereof and a chamfered inner periphery with the chamfered portion extending axially downward and radially outward from adjacent the top face thereof, and a circumferential expanding spring ring within said outer ring acting on the inner periphery thereof and effective to radially expand the outer ring while simultaneously twisting the outer ring in a direction to decrease the taper of the outer periphery of the outer ring, said outer ring and said spring ring having narrow axial widths and shallow radial depths and said spring ring having an inner diameter larger than the diameter of the ring groove to provide a free fit for the assembly in the ring groove thereby accommodating said twisting of the outer ring by the spring ring.

4. A highly flexible compression piston ring assembly adapted to conform to cylinder bore irregularities and exert high unit sealing pressures on the cylinder without bottoming in the ring groove of a piston receiving assembly which comprises a flat face solid dead split iron ring of shallow radial depth and thin width to fit freely for twistable deformation in the ring groove of the piston, said solid ring having, in its free state, a tapered outer periphery converging from the bottom to the top flat faces of the ring, a spring metal circumferential expander ring within said solid ring having an inner diameter larger than the diameter of the ring groove to be spaced radially outward therefrom and having an axial height less than the axial height of the ring groove to provide a free fit for the expander in the ring groove, said expander engaging a major portion of the inner circumference of the solid ring at closely spaced intervals and effective to exert radial force equally around the entire periphery of the solid ring to expand and twist the solid ring into sealing engagement with a surrounding bore wall and in side-sealing engagement with the sides of the piston ring groove into which the assembly is mounted.

5. A flexible compression ring assembly for the top and intermediate grooves of internal combustion engine pistons adapted to seal against a surrounding cylinder wall and the side walls of narrow piston ring grooves which comprises an outer solid ring component having top and bottom faces, an outer periphery sloping axially upward and radially inward from the bottom face to the top face and an inner periphery having a cylindrical portion normal to said faces, said outer ring component having a narrow axial width and a shallow radial depth to fit freely in a narrow ring groove, an inner ring component within said outer ring component and having a narrow axial width and a shallow radial depth to also fit freely in the same narrow ring groove with the outer ring component, said inner ring component exerting a circumferential expansion force equally around the cylindrical inner periphery of the outer ring component to simultaneously expand the outer ring component radially while twisting it in an axial direction into side-sealing engagement with the ring groove in which the assembly is mounted.

6. A flexible compression piston ring assembly which comprises a solid metal outer split ring component with top and bottom side faces, a tapered outer periphery and an inner periphery, an inner circumferential expansion spring ring component engaging the outer component around a major portion of the inner periphery thereof to exert a uniform expanding force thereagainst, the radial depth and axial width of said outer ring component being so related to the radial depth and axial width of the piston ring groove receiving the assembly so as to allow twisting of the outer component under the expanding action of the inner component for changing the angle taper of the outer periphery while engaging the top and bottom side faces against the sides of the ring groove, and said inner component having a radial depth and axial width so related to the radial depth and axial width of the piston ring groove receiving the assembly as to accommodate free floating movement of the inner component without bottoming on the ring groove even when fully compressed therein.

References Cited
UNITED STATES PATENTS

| | | | |
|---|---|---|---|
| 1,802,566 | 4/1931 | Marien | 277—160 |
| 2,173,190 | 9/1939 | Wilkening | 277—160 |
| 2,244,166 | 6/1941 | Marien | 277—138 |
| 2,855,254 | 10/1958 | Beck et al. | 277—143 |

LAVERNE D. GEIGER, *Primary Examiner.*

D. MASSENBERG, *Assistant Examiner.*